US012110839B1

(12) United States Patent
McCaffrey et al.

(10) Patent No.: US 12,110,839 B1
(45) Date of Patent: Oct. 8, 2024

(54) VARIABLE AREA NOZZLE ASSEMBLY FOR AN AIRCRAFT PROPULSION SYSTEM

(71) Applicant: RTX Corporation, Farmington, CT (US)

(72) Inventors: Michael G. McCaffrey, Windsor, CT (US); Nathan L. Messersmith, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/394,655

(22) Filed: Dec. 22, 2023

(51) Int. Cl.
*F02K 1/08* (2006.01)
*F02K 1/18* (2006.01)
*F02K 1/80* (2006.01)

(52) U.S. Cl.
CPC ............... *F02K 1/08* (2013.01); *F02K 1/18* (2013.01); *F02K 1/805* (2013.01); *F05D 2220/323* (2013.01); *F05D 2240/1281* (2013.01)

(58) Field of Classification Search
CPC ..... F02K 1/06; F02K 1/08; F02K 1/30; F02K 1/09
See application file for complete search history.

(56) References Cited

U.S. PATENT DOCUMENTS

| | | | | |
|---|---|---|---|---|
| 3,829,020 A * | 8/1974 | Stearns | ...................... | F02K 1/09 239/265.29 |
| 4,026,472 A * | 5/1977 | Rabone | ...................... | F02K 1/08 239/265.41 |
| 4,050,242 A * | 9/1977 | Dusa | ...................... | F02K 3/077 60/226.1 |
| 4,527,388 A * | 7/1985 | Wallace, Jr. | ............... | F02K 1/09 239/265.33 |
| 4,802,629 A * | 2/1989 | Klees | ...................... | F02K 1/625 239/265.33 |
| 5,307,624 A * | 5/1994 | Even-Nur | ............... | F02K 3/075 60/226.3 |
| 6,058,846 A * | 5/2000 | Boyd | ...................... | F02K 7/18 60/245 |
| 7,614,210 B2 * | 11/2009 | Powell | .................... | F02K 3/077 60/226.3 |
| 8,961,114 B2 | 2/2015 | Ruthemeyer | | |
| 9,759,133 B2 * | 9/2017 | Sidelkovskly | ............ | F02K 1/08 |
| 10,260,427 B2 | 4/2019 | Buey | | |

(Continued)

*Primary Examiner* — Craig Kim
(74) *Attorney, Agent, or Firm* — Getz Balich LLC (57) ABSTRACT

A variable area nozzle assembly includes a fixed center plug, a fixed outer nozzle, and an inner nozzle. The fixed center plug includes a seal. The inner nozzle is disposed between the fixed center plug and the fixed outer nozzle. The inner nozzle includes an inner nozzle body. The inner nozzle body forms a primary duct between the inner nozzle and the fixed outer nozzle. The inner nozzle body forms a secondary duct and a gap. The gap is a nozzle outlet of the secondary duct. The secondary duct is disposed between the inner nozzle body and the fixed center plug upstream of the seal. The inner nozzle body forms a plurality of apertures. The inner nozzle body is translatable between a first position and a second position. In the first position, the primary duct has a first cross-sectional area and the plurality of apertures are isolated from the gap by the seal. In the second position, the primary duct has a second cross-sectional area and the plurality of apertures are connected in fluid communication with the gap.

20 Claims, 4 Drawing Sheets

(56) References Cited

U.S. PATENT DOCUMENTS

| | | | |
|---|---|---|---|
| 10,371,094 B2* | 8/2019 | Rolt | F02K 3/075 |
| 10,378,478 B2* | 8/2019 | Roberge | F02K 3/075 |
| 10,927,761 B2* | 2/2021 | Rambo | F02K 3/115 |
| 10,995,700 B2* | 5/2021 | Ridray | B64D 29/06 |
| 11,143,052 B2* | 10/2021 | Tersmette | F01D 9/02 |
| 11,255,293 B2* | 2/2022 | Gardes | F02K 1/72 |
| 11,286,878 B2* | 3/2022 | Taylor | F02K 1/58 |
| 11,834,189 B2* | 12/2023 | Freund | B64D 29/06 |
| 2003/0150214 A1* | 8/2003 | Lair | F02K 1/78 60/771 |
| 2007/0186535 A1* | 8/2007 | Powell | F02K 3/072 60/263 |
| 2009/0158704 A1* | 6/2009 | Whurr | F02K 1/08 60/264 |
| 2009/0288386 A1* | 11/2009 | Marshall | F02K 1/09 60/204 |
| 2010/0050651 A1* | 3/2010 | Dindar | B64D 33/04 60/770 |
| 2010/0115958 A1* | 5/2010 | Parham | F02K 1/48 60/204 |
| 2010/0162725 A1* | 7/2010 | Zeaton | F02K 1/08 60/796 |
| 2012/0192543 A1* | 8/2012 | Aeberli | F02C 7/24 60/226.1 |
| 2016/0123178 A1* | 5/2016 | Tersmette | F02K 1/09 239/11 |
| 2020/0025022 A1* | 1/2020 | Tersmette | F02K 1/09 |

* cited by examiner

VARIABLE AREA NOZZLE ASSEMBLY FOR AN AIRCRAFT PROPULSION SYSTEM

BACKGROUND

1. Technical Field

This disclosure relates generally to aircraft propulsion systems and, more particularly, to variable area nozzle assemblies for an aircraft propulsion system exhaust.

2. Background Information

An exhaust nozzle assembly for an aircraft propulsion system may include one or more nozzles for directing exhaust gas from the propulsion system to the surrounding atmosphere. Various configurations of exhaust nozzle assemblies are known in the art. While these known exhaust nozzle assemblies have various advantages, there is still room in the art for improvement. There is a need in the art, therefore, for an improved exhaust nozzle assembly.

SUMMARY

It should be understood that any or all of the features or embodiments described herein can be used or combined in any combination with each and every other feature or embodiment described herein unless expressly noted otherwise.

According to an aspect of the present disclosure, a variable area nozzle assembly for an aircraft propulsion system includes a fixed center plug, a fixed outer nozzle, and an inner nozzle. The fixed center plug is disposed along an axis. The fixed center plug includes a plug body and a seal. The seal extends circumferentially about the plug body. The fixed outer nozzle extends circumferentially about the axis and the fixed center plug. The fixed outer nozzle includes a distal end. The inner nozzle extends circumferentially about the axis and the fixed center plug. The inner nozzle is disposed radially between the fixed center plug and the fixed outer nozzle. The inner nozzle includes an inner nozzle body. The inner nozzle body forms a primary duct for a primary gas stream radially between the inner nozzle and the fixed outer nozzle. The primary duct includes an exit plane at the distal end. The inner nozzle body forms a secondary duct and a gap. The gap is a nozzle outlet of the secondary duct. The secondary duct is disposed radially between the inner nozzle body and the fixed center plug upstream of the seal. The gap is disposed radially between the inner nozzle body and the fixed center plug downstream of the seal. The inner nozzle body forms a plurality of apertures. The inner nozzle body is axially translatable between and to a first axial position and a second axial position relative to the axis. In the first axial position, the primary duct has a first cross-sectional area at the exit plane and the plurality of apertures are isolated from the gap by the seal. In the second axial position, the primary duct has a second cross-sectional area at the exit plane, the second cross-sectional area is less than the first cross-sectional area, and the plurality of apertures are connected in fluid communication with the gap to direct a secondary gas stream from the secondary duct and into the gap.

In any of the aspects or embodiments described above and herein, the inner nozzle body may include an outer radial portion and an inner radial portion radially spaced from the outer radial portion. The outer radial portion may form the primary duct, and the inner radial portion may form the gap and the plurality of apertures.

In any of the aspects or embodiments described above and herein, the inner radial portion may include an inner radial surface and an outer radial surface. Each aperture of the plurality of apertures may extend between and to the inner radial surface and the outer radial surface. The inner radial surface may form the gap. The inner radial surface may contact the seal.

In any of the aspects or embodiments described above and herein, the inner nozzle body may further include an inner converging portion. The inner converging portion may extend between and to the outer radial portion and the inner radial portion.

In any of the aspects or embodiments described above and herein, the fixed outer nozzle may include an outer nozzle body. The outer nozzle body may include an outer converging portion. The outer converging portion may be disposed axially coincident with the inner converging portion.

In any of the aspects or embodiments described above and herein, the variable area nozzle assembly may further include a linear actuation system. The linear actuation system may be operably connected to the inner nozzle body. The linear actuation system may be configured to effect and control axial translation of the inner nozzle body between and to the first axial position and the second axial position.

In any of the aspects or embodiments described above and herein, the variable area nozzle assembly may further include a controller. The controller may be connected in communication with the linear actuation system. The controller may include a processor in communication with a non-transitory memory storing instructions, which instructions when executed by the processor, may cause the processor to control a flow of the primary gas stream through the primary duct by controlling the actuation system to position the inner nozzle body in the first axial position or the second axial position.

In any of the aspects or embodiments described above and herein, the plurality of apertures may include a first aperture and a second aperture. The first aperture may be disposed at a first axial position on the inner nozzle body. The second aperture may be disposed at a second axial position on the inner nozzle body. The second axial position may be axially spaced from the first axial position.

In any of the aspects or embodiments described above and herein, the variable area nozzle assembly may further include an actuation system and a controller. The actuation system may be operably connected to the inner nozzle body. The controller may be connected in communication with the actuation system. The controller may include a processor in communication with a non-transitory memory storing instructions, which instructions when executed by the processor, may cause the processor to control a flow of the secondary gas stream from the secondary duct to the gap by controlling the actuation system to position the inner nozzle body in the first axial position, the second axial position, or an intermediate axial position between the first axial position with a first subset of the plurality of apertures connected in fluid communication with the gap to direct the secondary gas stream from the secondary duct and to the gap and a second subset of the plurality of apertures isolated from the gap by the seal.

In any of the aspects or embodiments described above and herein, the plug body may form one or more passages. Each passage of the one or more passages may include a passage inlet and a passage outlet. The passage inlet may be disposed at and in fluid communication with the secondary duct. The passage outlet may be disposed at and in fluid communication with the gap.

According to another aspect of the present disclosure, a variable area nozzle assembly for an aircraft propulsion system includes a center plug, an outer nozzle, and an inner nozzle. The center plug is disposed along an axis. The center plug includes a plug body and a seal. The seal extends circumferentially about the plug body. The outer nozzle extends circumferentially about the axis and the center plug. The inner nozzle extends circumferentially about the axis and the center plug. The inner nozzle is disposed radially between the center plug and the outer nozzle. The inner nozzle includes an inner nozzle body. The inner nozzle body forms a secondary duct for a secondary gas stream radially between the inner nozzle body and the center plug. The inner nozzle body includes an outer radial portion, an inner converging portion, and an inner radial portion. The outer radial portion and the inner converging portion form a primary duct for a primary gas stream radially between the inner nozzle body and the outer nozzle. The inner converging portion extends between and to the outer radial portion and the inner radial portion. The inner radial portion is radially spaced inward of the outer radial portion. The inner radial portion includes an outer radial surface and an inner radial surface. The outer radial surface faces the inner converging portion. The inner radial surface faces the center plug and contacts the seal. The inner radial surface forms a nozzle outlet for the secondary gas stream downstream of the seal between the inner radial surface and the center plug. The inner radial portion forms a plurality of apertures extending between and to the outer radial surface and the inner radial surface. The plurality of apertures are disposed at and in fluid communication with the secondary duct.

In any of the aspects or embodiments described above and herein, the outer nozzle may include an outer nozzle body. The outer nozzle body may include an outer converging portion. The outer converging portion may be disposed axially coincident with the inner converging portion.

In any of the aspects or embodiments described above and herein, the plurality of apertures may include a first aperture and a second aperture. The first aperture may be disposed at a first axial position on the inner nozzle body. The second aperture may be disposed at a second axial position on the inner nozzle body. The second axial position may be axially spaced from the first axial position.

In any of the aspects or embodiments described above and herein, the plug body may form one or more passages. Each passage of the one or more passages may include a passage inlet and a passage outlet. The passage inlet may be disposed at and in fluid communication with the secondary duct. The passage outlet may be disposed at and in fluid communication with the nozzle outlet.

In any of the aspects or embodiments described above and herein, the passage inlet may be disposed axially forward of the seal and the passage outlet may be disposed axially aftward of the seal.

According to another aspect of the present disclosure, a propulsion system for an aircraft includes a gas turbine engine, a nacelle, and a variable area nozzle assembly. The gas turbine engine is disposed along an axial centerline. The gas turbine engine forms a core flow path. The nacelle extends circumferentially about and houses the gas turbine engine. The nacelle forms a bypass flow path radially between the nacelle and the gas turbine engine. The variable area nozzle assembly includes a fixed center plug, a fixed outer nozzle, and an inner nozzle. The fixed center plug is disposed along the axial centerline. The fixed center plug includes a plug body and a seal. The seal extends circumferentially about the plug body. The fixed outer nozzle extends circumferentially about the axial centerline and the fixed center plug. The fixed outer nozzle includes a distal end. The inner nozzle extends circumferentially about the axial centerline and the fixed center plug. The inner nozzle is disposed radially between the fixed center plug and the fixed outer nozzle. The inner nozzle includes an inner nozzle body. The inner nozzle body forms a primary duct radially between the inner nozzle and the fixed outer nozzle. The primary duct is configured to receive a core combustion gas flow from the gas turbine engine along the core flow path. The primary duct includes an exit plane at the distal end. The inner nozzle body forms a secondary duct. The secondary duct is disposed radially between the inner nozzle body and the fixed center plug upstream of the seal. The secondary duct is configured to receive at least a portion of a bypass air flow along the bypass flow path. The inner nozzle body forms a plurality of apertures. The inner nozzle body is axially translatable between and to a first axial position and a second axial position relative to the axial centerline. In the first axial position, the primary duct has a first cross-sectional area at the exit plane and the plurality of apertures are isolated from a nozzle outlet of the secondary duct by the seal. In the second axial position, the primary duct has a second cross-sectional area at the exit plane, the second cross-sectional area is less than the first cross-sectional area, and the plurality of apertures are connected in fluid communication with the nozzle outlet to direct the bypass air flow from the secondary duct and into the nozzle outlet.

In any of the aspects or embodiments described above and herein, the inner nozzle body may include an outer radial portion and an inner radial portion radially spaced from the outer radial portion. The outer radial portion may form the primary duct. The inner radial portion may form the nozzle outlet and the plurality of apertures.

In any of the aspects or embodiments described above and herein, the inner radial portion may include an inner radial surface and an outer radial surface. Each aperture of the plurality of apertures may extend between and to the inner radial surface and the outer radial surface. The inner radial surface may form the nozzle outlet. The inner radial surface may contact the seal.

In any of the aspects or embodiments described above and herein, the plurality of apertures may include a first aperture and a second aperture. The first aperture may be disposed at a first axial position on the inner nozzle body. The second aperture may be disposed at a second axial position on the inner nozzle body. The second axial position may be axially spaced from the first axial position.

In any of the aspects or embodiments described above and herein, the plug body may form one or more passages. Each passage of the one or more passages includes a passage inlet and a passage outlet. The passage inlet may be disposed at and in fluid communication with the secondary duct. The passage outlet may be disposed at and in fluid communication with the nozzle outlet.

The present disclosure, and all its aspects, embodiments and advantages associated therewith will become more readily apparent in view of the detailed description provided below, including the accompanying drawings.

DETAILED DESCRIPTION

Figure 1:
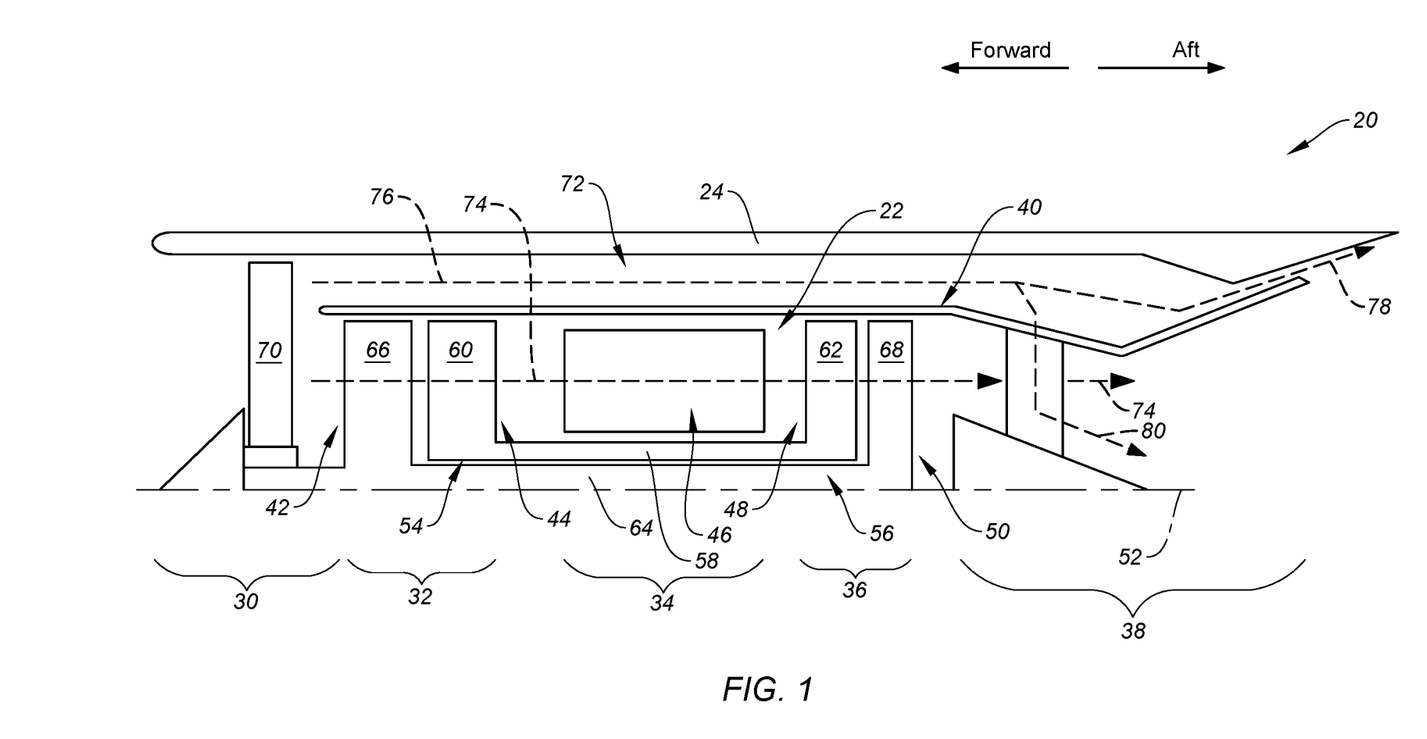
FIG. 1 schematically illustrates a cutaway, side view of an aircraft propulsion system including a gas turbine engine, in accordance with one or more embodiments of the present disclosure.

FIG. 1 schematically illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The propulsion system 20 of FIG. 1 includes a gas turbine engine 22 and a nacelle 24.

The gas turbine engine 22 of FIG. 1 is configured as a multi-spool turbofan gas turbine engine. While the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 22 of FIG. 1 includes a fan section, 30, a compressor section 32, a combustor section 34, a turbine section 36, an exhaust section 38, and an engine static structure 40. The compressor section 32 includes a low-pressure compressor 42 and a high-pressure compressor 44. The combustor section 34 includes a combustor 46 (e.g., an annular combustor). The turbine section 36 includes a high-pressure turbine 48 and a low-pressure turbine 50. The gas turbine engine 22 sections 30, 32, 34, 36, 38 of FIG. 1 are sequentially arranged along an axial centerline 52 (e.g., a rotational axis) of the gas turbine engine 22. The engine static structure 40 may include, for example, one or more engine cases for the gas turbine engine 22. The engine static structure 40 may additionally include cowlings, bearing assemblies, or other structural components of the gas turbine engine 22. The engine static structure 40 houses and structurally supports the gas turbine engine 22 sections 30, 32, 34, 36, 38 of FIG. 1.

Components of the fan section 30, the compressor section 32 and the turbine section 36 of FIG. 1 form a first rotational assembly 54 (e.g., a high-pressure spool) and a second rotational assembly 56 (e.g., a low-pressure spool). The first rotational assembly 54 and the second rotational assembly 56 are mounted for rotation about the axial centerline 52 relative to the engine static structure 40.

The first rotational assembly 54 includes a first shaft 58, a bladed first compressor rotor 60 for the high-pressure compressor 44, and a bladed first turbine rotor 62 for the high-pressure turbine 48. The first shaft 58 interconnects the bladed compressor rotor 60 and the bladed first turbine rotor 62.

The second rotational assembly 56 includes a second shaft 64, a bladed second compressor rotor 66 for the low-pressure compressor 42, and a bladed second turbine rotor 68 for the low-pressure turbine 50. The second shaft 64 may additionally be directly or indirectly connected to a bladed fan rotor 70 of the fan section 30. For example, the second shaft 64 may be connected to the bladed fan rotor 70 by one or more gear assemblies (not shown) configured to drive the bladed fan rotor 70 at a reduced rotational speed relative to the second shaft 64. The first shaft 58 and the second shaft 64 of FIG. 1 are concentric and configured to rotate about the axial centerline 52. The present disclosure, however, is not limited to concentric configurations of the first shaft 58 and the second shaft 64 and the first shaft 58 and the second shaft 64 may alternatively be configured for rotation about discrete rotational axes.

The nacelle 24 is configured to house and provide an aerodynamic cover for the gas turbine engine 22. The nacelle 24 may circumscribe (e.g., extend circumferentially about) and form an annular bypass duct 72 through the propulsion system 20. For example, the bypass duct 72 may be formed by and between (e.g., radially between) the gas turbine engine 22 and the nacelle 24. The bypass duct 72 may extend (e.g., axially extend) between and to the fan section 30 and the exhaust section 38.

During operation of the gas turbine engine 22, ambient air enters the gas turbine engine 22 and is directed through the engine sections 32, 34, 36, 38 along a core flow path 74. The air within the core flow path 74 may be referred to as "core air." The core air is compressed in the low-pressure compressor 42 and the high-pressure compressor 44 by the bladed second compressor rotor 66 and the bladed first compressor rotor 60, respectively, and directed into a combustion chamber of the combustor 46. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 62 and the bladed second turbine rotor 68 to rotate. The rotation of the bladed first turbine rotor 62 and the bladed second turbine rotor 68 respectively drives rotation of the first rotational assembly 54 and the second rotational assembly 56. Rotation of the second rotational assembly 56 further drives rotation of the bladed fan rotor 70 to direct air into the core flow path 74 as well as a bypass flow path 76. The air within the bypass flow path 76 may be referred to as "bypass air." The bypass air is directed through the propulsion system 20 within the bypass duct 72.

Gas flow along the core flow path 74 and the bypass flow path 76 is directed out of the propulsion system 20 through the exhaust section 38. The nacelle 24 and the engine static structure 40 may form or otherwise support portions of the exhaust section 38. The exhaust section 38 of FIG. 1 is configured to separate the bypass flow path 76 into an outer bypass flow path 78 (e.g., an outer radial bypass flow path) and an inner bypass flow path 80 (e.g., an inner radial bypass flow path). Accordingly, at least some of the bypass air may be directed along the outer bypass flow path 78, the inner bypass flow path 80, or both of the outer bypass flow path 78 and the inner bypass flow path 80. Bypass air along the outer bypass flow path 78 is directed within the exhaust section 38 to a position radially outward (e.g., outboard) of the core flow path 74. Bypass air along the inner bypass flow path 80 is directed within the exhaust section 38 to a position radially inward (e.g., inboard) of the core flow path 74. For example, the inner bypass flow path 80 may be formed by one or more hollow struts, one or more transition ducts, or another suitable gas conduit for directing the bypass air radially inward of the core flow path 74. The present disclosure is not limited to the foregoing exemplary configuration of the gas turbine engine 22, the nacelle 24, and/or the exhaust section 38 of FIG. 1 for forming the outer bypass flow path 78 and the inner bypass flow path 80. In some embodiments, all or substantially all of the bypass air may be directed along the inner bypass flow path 80 to a position radially inward of the core flow path 74. For example, the exhaust section 38 may not form an outer bypass flow path such as the outer bypass flow path 78).

Figure 2:
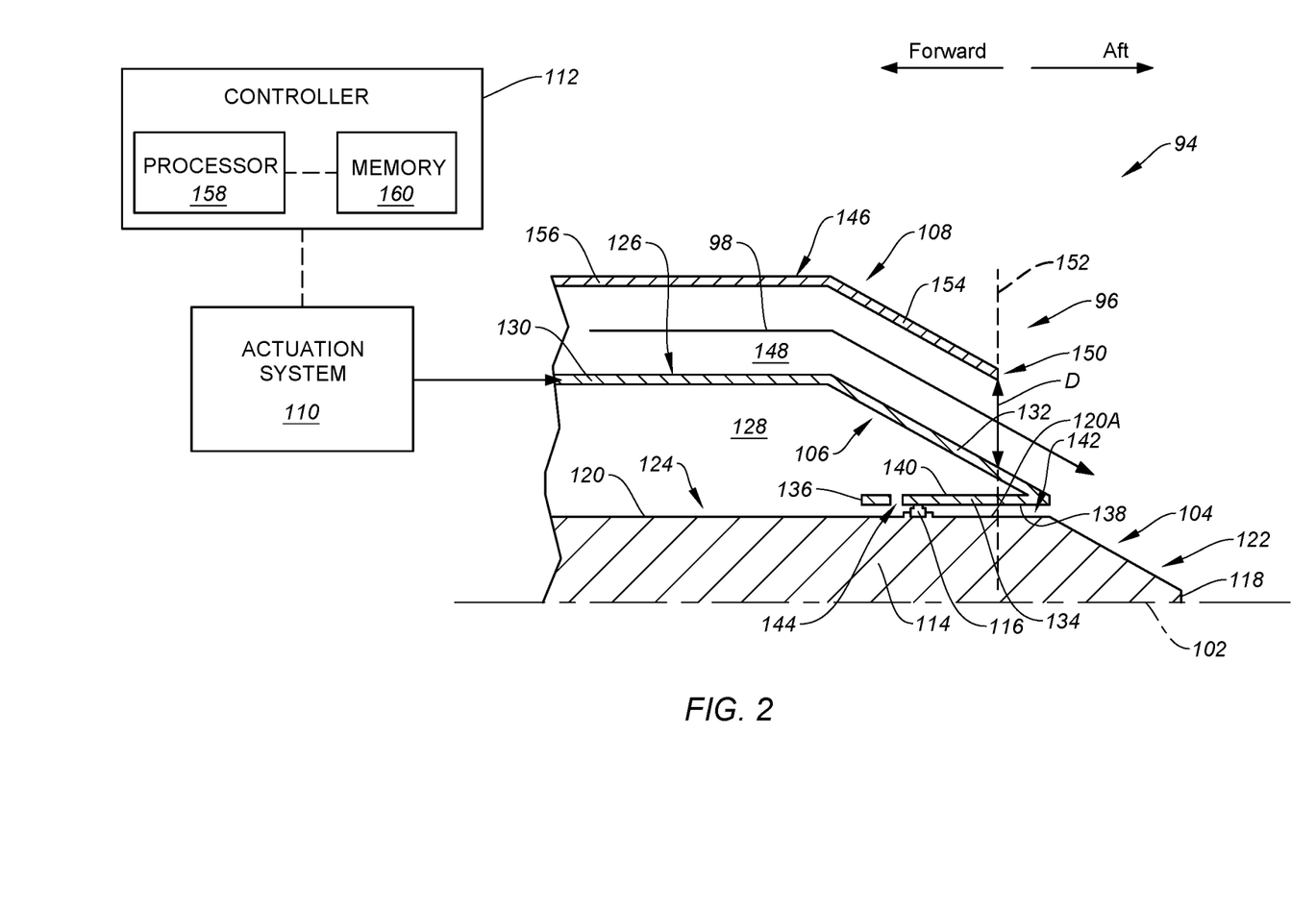
FIG. 2 schematically illustrates a cutaway, side view of a variable area nozzle assembly for an aircraft propulsion system with a nozzle of the variable area nozzle assembly in a first axial position, in accordance with one or more embodiments of the present disclosure.
Figure 3:
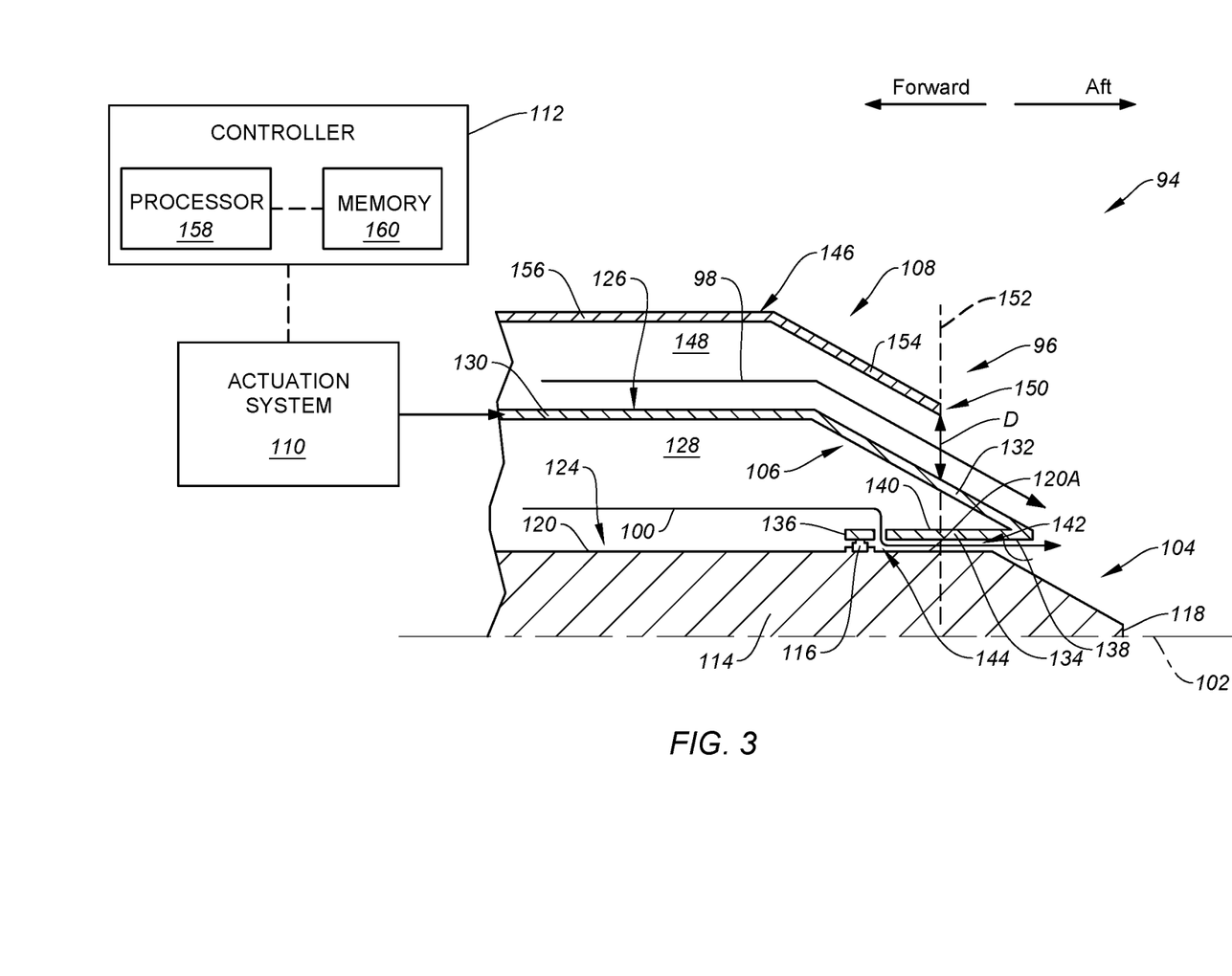
FIG. 3 schematically illustrates a cutaway, side view of the variable area nozzle assembly of FIG. 2 with the nozzle in a second axial position, in accordance with one or more embodiments of the present disclosure.

FIGS. 2 and 3, illustrate a portion of an exhaust section 94 for an aircraft propulsion system such as the propulsion system 20 of FIG. 1. The exhaust section 94 includes a variable area nozzle assembly 96 configured to control gas (e.g., air, combustion exhaust, etc.) flow through the exhaust section 94. The variable area nozzle assembly 96 is configured to control the flow of a primary gas stream 98 and a secondary gas stream 100 through the exhaust section 94. The primary gas stream 98 may be an engine exhaust gas stream such as, but not limited to, the core combustion gas flow along the core flow path 74 of FIG. 1. The secondary gas stream 100 may be an air stream (e.g., a bypass air stream, a compressed air stream, etc.) such as, but not limited to, the bypass air flow along the inner bypass flow path 80 of FIG. 1. The primary gas stream 98 of FIGS. 2 and 3 is disposed radially outward (e.g., outboard) of the secondary gas stream 100 within the variable area nozzle assembly 96. The present disclosure, however, is not limited to the foregoing exemplary gas streams illustrated in FIGS. 2 and 3.

The variable area nozzle assembly 96 is disposed along an axis 102. The axis 102 may be the same as or different than the axial centerline 52 (see FIG. 1). The variable area nozzle assembly 96 includes a center plug 104, an inner nozzle 106, an outer nozzle 108, and an actuation system 110. The variable area nozzle assembly 96 may further include a controller 112.

The center plug 104 is disposed at (e.g., on, adjacent, or proximate) the axis 102 forming an axial center of the variable area nozzle assembly 96. The center plug 104 of FIGS. 2 and 3 is fixed relative to the axis 102. The center plug 104 includes a plug body 114 and a seal 116. The plug body 114 extends along the axis 102 to a distal end 118 (e.g., an aft end) of the plug body 114. The plug body 114 includes an outer radial side 120. The outer radial side 120 extends about (e.g., circumferentially completely around) the axis 102. The outer radial side 120 may form a converging portion 122 and an upstream portion 124. The converging portion 122 may be disposed at (e.g., on, adjacent, or proximate) the distal end 118. The upstream portion 124 extends in an upstream direction (e.g., an axially forward direction) from the converging portion 122. The seal 116 is mounted to or otherwise disposed on the plug body 114 at (e.g., on, adjacent, or proximate) the outer radial side 120. For example, the seal 116 may be disposed on the upstream portion 124. The seal 116 may be an annular seal extending circumferentially about (e.g., completely around) the plug body 114 and the axis 102. As used herein, the terms "upstream" and "downstream" may be understood relative to a flow direction of the primary gas stream 98 and/or the secondary gas stream 100.

The inner nozzle 106 is disposed radially outward of and adjacent the center plug 104. The inner nozzle 106 includes an inner nozzle body 126. The inner nozzle body 126 forms an annular secondary duct 128 between (e.g., radially between) the inner nozzle body 126 and the plug body 114. The secondary gas stream 100 flows (e.g., is directed) through the variable area nozzle assembly 96 within the secondary duct 128. The inner nozzle body 126 of FIGS. 2 and 3 includes an outer radial portion 130, a converging portion 132, and an inner radial portion 134. Each of the outer radial portion 130, the converging portion 132, and the inner radial portion 134 extend circumferentially about (e.g., completely around) the center plug 104 and the axis 102. The converging portion 132 extends between and to the outer radial portion 130 and the inner radial portion 134. In particular, the converging portion 132 extends radially inward and axially aftward from the outer radial portion 130 to the inner radial portion 134. The inner radial portion 134 is disposed radially inward of and spaced from the outer radial portion 130. The inner radial portion 134 extends (e.g., axially extends) from the converging portion 132 to a distal end 136 of the inner radial portion 134. The inner radial portion 134 forms an inner radial surface 138 and an outer radial surface 140. The inner radial surface 138 and the outer radial surface 140 extend (e.g., axially extend) from the converging portion 132 to the distal end 136. The inner radial surface 138 faces and extends circumferentially about (e.g., completely around) the center plug 104 and the axis 102. The inner radial surface 138 is positioned to contact the seal 116 to form a fluid seal between the inner nozzle 106 and the center plug 104. The inner radial surface 138 forms a gap 142 (e.g., an annular gap) radially between the inner radial surface 138 and a portion 120A of the outer radial side 120 downstream (e.g., axially aft) of the seal 116. The gap 142 forms a nozzle outlet of the variable area nozzle assembly 96 for the secondary duct 128. The inner radial portion 134 forms a plurality of apertures 144 extending between and to the inner radial surface 138 and the outer radial surface 140. The apertures 144 are disposed in fluid communication with the secondary duct 128. The apertures 144 may be circumferentially distributed about the inner radial portion 134. For example, the inner radial portion 134 of FIGS. 2 and 3 form a single axial row of the apertures 144 circumferentially distributed about the inner radial portion 134. The present disclosure, however, is not limited to the foregoing exemplary configuration of the apertures 144.

The inner nozzle 106 is axially translatable along the axis 102 between and to a first axial position (e.g., a forwardmost axial position) and a second axial position (e.g., an aftmost axial position). FIG. 2 illustrates the inner nozzle 106 in the first axial position. FIG. 3 illustrates the inner nozzle 106 in the second axial position. The inner nozzle 106 may be positionable in a plurality of intermediate axial positions between the first axial position and the second axial position. In the first axial position of the inner nozzle 106 of FIG. 2, the apertures 144 are positioned upstream (e.g., axially forward) of the seal 116. In this first axial position of the inner nozzle 106, the apertures 144 are isolated from the gap 142 by the seal 116 and the secondary gas stream 100 is not directed from the secondary duct 128 to the gap 142 through the apertures 144. In the second axial position of the inner nozzle 106 of FIG. 3, the apertures 144 are positioned downstream (e.g., axially aftward) of the seal 116. In this second axial position of the inner nozzle 106, the secondary gas stream 100 is directed from the secondary duct 128 to the gap 142 through the apertures 144.

The outer nozzle 108 is disposed radially outward of and adjacent the inner nozzle 106. The outer nozzle 108 includes an outer nozzle body 146. The outer nozzle body 146 forms an annular primary duct 148 between (e.g., radially between) the outer nozzle body 146 and the inner nozzle body 126.

The primary gas stream 98 flows (e.g., is directed) through the variable area nozzle assembly 96 within the primary duct 148. The outer nozzle body 146 may be fixed relative to the axis 102. The outer nozzle body 146 extends along the axis 102 to a distal end 150 (e.g., an at end) of the outer nozzle body 146. The distal end 150 may be disposed upstream (e.g., axially forward) of the distal end 118. The outer nozzle body 146 forms an exit plane 152 of the variable area nozzle assembly 96 for the primary gas stream 98 at (e.g., on, adjacent, or proximate) the distal end 150. The outer nozzle body 146 includes a converging portion 154 and an upstream portion 156. The converging portion 154 is disposed at (e.g., on, adjacent, or proximate) the distal end 150. The converging portion 154 extends radially inward and axially aftward from the upstream portion 156 to the distal end 150. The converging portion 154 is disposed axially coincident with the converging portion 132. The converging portion 154 is spaced from the converging portion 132 by a distance D (e.g., a radial distance) along the exit plane 152 to form an annular exit cross-sectional area for the primary duct 148 at (e.g., on, adjacent, or proximate) the exit plane 152. The upstream portion 156 extends in an upstream direction (e.g., an axially forward direction) from the converging portion 154.

The actuation system 110 is configured to effect and control axial translation of the inner nozzle 106 between and to the first axial position (see FIG. 2) and the second axial position (see FIG. 3). The actuation system 110 may be mounted or otherwise operably connected to the inner nozzle body 126 (e.g., the outer radial portion 134). For example, the actuation system 110 may include a linear actuator connected to the inner nozzle body 126 and configured to effect and control axial translation of the inner nozzle 106 along the axis 102. The actuation system 110 may be configured as a hydraulic actuation system, a pneumatic actuation system, an electro-mechanical actuation system, or the like, and the present disclosure is not limited to any particular configuration of the actuation system 110 for effecting and controlling axial translation of the inner nozzle 106.

In operation, the actuation system 110 controls an axial position (e.g., the first axial position, the second axial position, or an intermediate position) of the inner nozzle 106 to control an area of the annular exit cross-sectional area for the primary duct 148 at (e.g., on, adjacent, or proximate) the exit plane 152, thereby controlling the flow of the primary gas stream 98 through the primary duct 148. As shown in FIGS. 2 and 3, axial translation of the inner nozzle 106 (e.g., effected by the actuation system 110) causes a value of the distance D and, hence, the annular exit cross-sectional area to change. For example, the distance D with the inner nozzle 106 in the first position (see FIG. 2) is greater than the distance D with the inner nozzle 106 in the second position (see FIG. 3). As previously discussed, the axial translation of the inner nozzle 106 additionally controls the position of the apertures 144 relative to the seal 116. Accordingly, the variable area nozzle assembly 96 may facilitate control of the flow of the secondary gas stream 100 (e.g., through the apertures 144) and the primary gas stream 98 (e.g., through the exit plane 152) with movement of a single variable area nozzle assembly 96 component (e.g., the inner nozzle 106). For example, as the inner nozzle 106 of FIGS. 2 and 3 translates in the axially aft direction, a flow rate of the primary gas stream 98 is decreased while a flow rate of the secondary gas stream 100 is (or may be) increased. The flow of the secondary gas stream 100 through the variable area nozzle assembly 96 (e.g., through the apertures 144) may facilitate cooling of the variable area nozzle assembly 96, which cooling of the variable area nozzle assembly 96 may be particularly desirable during certain operating conditions of the gas turbine engine 22 and the variable area nozzle assembly 96. The position and orientation of the primary gas stream 98 exiting the variable area nozzle assembly 96 at (e.g., on, adjacent, or proximate) the exit plane 152 may form a low-pressure region in proximity to the gap 142, thereby facilitating improved secondary gas stream 100 flow through the variable area nozzle assembly 96.

As previously discussed, the variable area nozzle assembly 96 may include the controller 112. The controller 112 may be configured, for example, to control operation of the actuation system 110 to position the inner nozzle 106. The controller 112 includes a processor 158 connected in signal communication with memory 160. The processor 158 may include any type of computing device, computational circuit, processor(s), CPU, computer, or the like capable of executing a series of instructions that are stored in the memory 160. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the variable area nozzle assembly 96 its components to accomplish the same algorithmically and/or by coordination of the variable area nozzle assembly 96 components. For example, the controller 112 may be connected in electrical (e.g., signal) communication with the actuation system 110 to control a position of the inner nozzle 106 as shown, for example, in FIGS. 2 and 3. The memory 160 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 112. The controller 112 may include, or may be in communication with, an input device that enables a user to enter data and/or instructions, and may include, or be in communication with, an output device configured, for example to display information (e.g., a visual display or a printer), or to transfer data, etc. Communications between the controller 112 and other electrical and/or electronic components (e.g., controllers, sensors, etc.) may be via a hardwire connection or via a wireless connection. A person of skill in the art will recognize that portions of the controller 112 may assume various forms (e.g., digital signal processor, analog device, etc.) capable of performing the functions described herein.

The controller 112 may form or otherwise be part of an electronic engine controller (EEC) for the gas turbine engine 22. For example, the EEC may control aspects of the gas turbine engine 22 operation such as, but not limited to, fuel flow, stator vane position (e.g., variable compressor inlet guide vane (IGV) position), compressor air bleed valve position, shaft (e.g., first shaft 58 and/or second shaft 64) torque and/or rotation speed, etc. so as to control an engine power or performance of the gas turbine engine 22. For example, the EEC may modulate fuel flow to the combustor 46 to obtain a desired output power of the gas turbine engine 22. In some embodiments, the EEC may be part of a full authority digital engine control (FADEC) system for the propulsion system 20.

Figure 4:
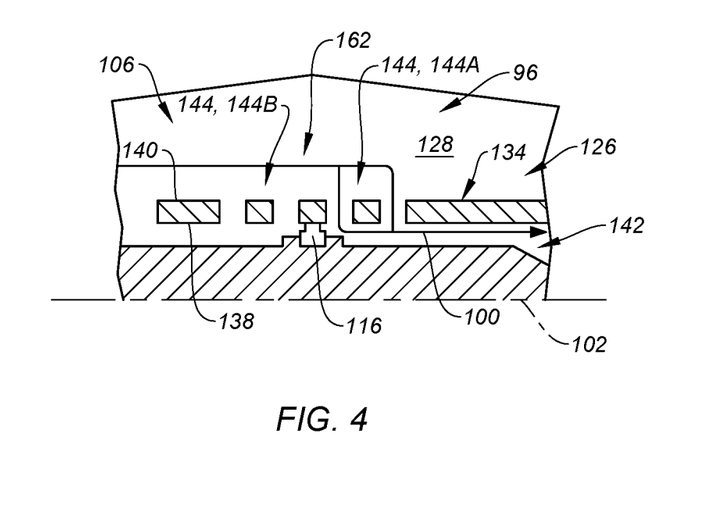
FIG. 4 illustrates a cutaway, side view of a portion of another variable area nozzle assembly, in accordance with one or more embodiments of the present disclosure.

Referring to FIG. 4, in some embodiments, the inner radial portion 134 may form the apertures 144 distributed axially along the inner radial portion 134. For example, the inner radial portion 134 of FIG. 4 forms a plurality of axial rows 162 of the apertures 144 with the apertures 144 of each axial row circumferentially distributed about the inner radial portion 134. The present disclosure, however, is not limited to the axial arrangement of the apertures 144 in axial rows. The inner nozzle 106 may be axially positioned with the actuation system 110 (see FIGS. 2-3; e.g., controlled by the controller 112) relative to an axial position of the seal 116 to control a flow rate of the secondary gas stream 100 through the apertures 144. For example, the inner nozzle 106 may be axially positioned relative to the seal 116 such that a first subset 144A (e.g., an open subset) of the apertures 144 (e.g., the axial rows 162) is disposed downstream (e.g., axially aft) of the seal 116 and a second subset 144B (e.g., a closed subset) of the apertures 144 (e.g., the axial rows 162) is disposed upstream (e.g., axially forward) of the seal 116. The secondary gas stream 100 may be directed through the first subset 144A into the gap 142. Accordingly, the inner nozzle 106 may be axially positioned with the actuation system 110 (see FIGS. 2-3; e.g., controlled by the controller 112) to control a quantity of the apertures 144 in the first subset 144A, thereby controlling (e.g., metering) the flow rate of the secondary gas stream 100 into and through the gap 142. A density of the apertures 144 (e.g., a quantity of the apertures 144 per unit area of the inner radial surface 138 and/or the outer radial surface 140) may be constant or substantially constant in the axial direction. Alternatively, in some embodiments, a density of the apertures 144 may vary in the axial direction to facilitate control of the secondary gas stream 100 flow rate relative to the primary gas stream 98 (see FIGS. 2 and 3) flow rate.

Figure 5:
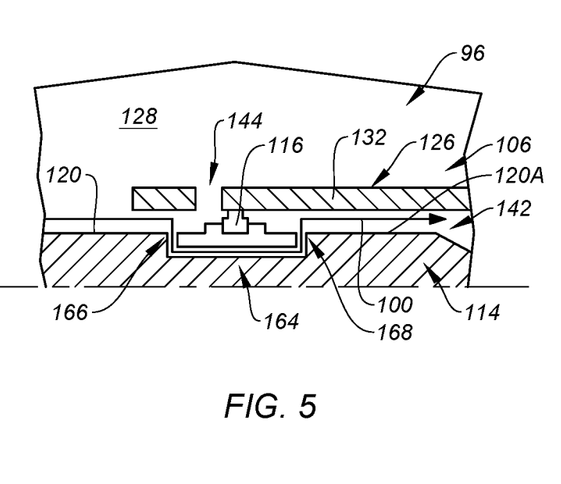
FIG. 5 illustrates a cutaway, side view of a portion of another variable area nozzle assembly, in accordance with one or more embodiments of the present disclosure.

Referring to FIG. 5, in some embodiments, the plug body 114 may form one or more passages 164 bypassing the seal 116. The passages 164 may be circumferentially distributed about the plug body 114. Each of the passages 164 extends between and to a passage inlet 166 and a passage outlet 168. The passage inlet 166 is disposed at (e.g., on, adjacent, or proximate) the outer radial side 120 upstream (e.g., axially forward) of the seal 116. The passage inlet 166 is disposed at (e.g., on, adjacent, or proximate) and connected in fluid communication with the secondary duct 128. The passage outlet 168 is disposed at (e.g., on, adjacent, or proximate) the portion 120A of the outer radial side 120 downstream (e.g., axially aftward) of the seal 116. The passage outlet 168 is disposed at (e.g., on, adjacent, or proximate) and connected in fluid communication with the gap 142. The passages 164 facilitate the flow of the secondary gas stream 100 into and through the gap 142 without regard to the axial position of the inner nozzle 106. For example, the passages 164 facilitate at least some flow of the secondary gas stream 100 through the secondary duct 128 and into and through the gap 142 with the inner nozzle 106 in the first axial position (e.g., with no secondary gas stream 100 flow through the apertures 144), the second axial position (e.g., with secondary gas stream 100 flow through the apertures 144), or an intermediate axial position. In some embodiments, the plug body 114 may form the passages 164 and the inner radial portion 132 may not form the apertures 144. Accordingly, all or substantially all of the secondary gas stream 100 flow may be directed through the passages 164.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts, and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A variable area nozzle assembly for an aircraft propulsion system, the variable area nozzle assembly comprising:
a fixed center plug disposed along an axis, the fixed center plug includes a plug body and a seal, and the seal extends circumferentially about the plug body;
a fixed outer nozzle extending circumferentially about the axis and the fixed center plug, the fixed outer nozzle includes a distal end; and
an inner nozzle extending circumferentially about the axis and the fixed center plug, the inner nozzle is disposed radially between the fixed center plug and the fixed outer nozzle, the inner nozzle includes an inner nozzle body, the inner nozzle body forms a primary duct for a primary gas stream radially between the inner nozzle and the fixed outer nozzle, the primary duct includes an exit plane at the distal end, the inner nozzle body forms a secondary duct and a gap, the gap is a nozzle outlet of the secondary duct, the secondary duct is disposed radially between the inner nozzle body and the fixed center plug upstream of the seal, the gap is disposed radially between the inner nozzle body and the fixed center plug downstream of the seal, the inner nozzle body forms a plurality of apertures, and the inner nozzle body is axially translatable between and to a first axial position and a second axial position relative to the axis,
in the first axial position, the primary duct has a first cross-sectional area at the exit plane and the plurality of apertures are isolated from the gap by the seal, and
in the second axial position, the primary duct has a second cross-sectional area at the exit plane, the second cross-sectional area is less than the first cross-sectional area, and the plurality of apertures are connected in fluid communication with the gap to direct a secondary gas stream from the secondary duct and into the gap.

2. The variable area nozzle assembly of claim 1, the inner nozzle body includes an outer radial portion and an inner radial portion radially spaced from the outer radial portion, the outer radial portion forms the primary duct, and the inner radial portion forms the gap and the plurality of apertures.

3. The variable area nozzle assembly of claim 2, wherein the inner radial portion includes an inner radial surface and an outer radial surface, each aperture of the plurality of apertures extends between and to the inner radial surface and the outer radial surface, the inner radial surface forms the gap, and the inner radial surface contacts the seal.

4. The variable area nozzle assembly of claim 2, wherein the inner nozzle body further includes an inner converging portion, and the inner converging portion extends between and to the outer radial portion and the inner radial portion.

5. The variable area nozzle assembly of claim 4, wherein the fixed outer nozzle includes an outer nozzle body, the outer nozzle body includes an outer converging portion, and the outer converging portion is disposed axially coincident with the inner converging portion.

6. The variable area nozzle assembly of claim 1, further comprising a linear actuation system, the actuation system is operably connected to the inner nozzle body, and the linear actuation system is configured to effect and control axial translation of the inner nozzle body between and to the first axial position and the second axial position.

7. The variable area nozzle assembly of claim 6, further comprising a controller, the controller is connected in communication with the linear actuation system, the controller includes a processor in communication with a non-transitory memory storing instructions, which instructions when executed by the processor, cause the processor to:
control a flow of the primary gas stream through the primary duct by controlling the linear actuation system to position the inner nozzle body in the first axial position or the second axial position.

8. The variable area nozzle assembly of claim 1, wherein the plurality of apertures includes a first aperture and a second aperture, the first aperture is disposed at a first axial position on the inner nozzle body, the second aperture is disposed at a second axial position on the inner nozzle body, and the second axial position is axially spaced from the first axial position.

9. The variable area nozzle assembly of claim 1, further comprising:
an actuation system operably connected to the inner nozzle body;
a controller connected in communication with the actuation system, the controller includes a processor in communication with a non-transitory memory storing instructions, which instructions when executed by the processor, cause the processor to:
control a flow of the secondary gas stream from the secondary duct to the gap by controlling the actuation system to position the inner nozzle body in the first axial position, the second axial position, or an intermediate axial position between the first axial position with a first subset of the plurality of apertures connected in fluid communication with the gap to direct the secondary gas stream from the secondary duct and to the gap and a second subset of the plurality of apertures isolated from the gap by the seal.

10. The variable area nozzle assembly of claim 1, wherein the plug body forms one or more passages, each passage of the one or more passages includes a passage inlet and a passage outlet, the passage inlet is disposed at and in fluid communication with the secondary duct, and the passage outlet is disposed at and in fluid communication with the gap.

11. A variable area nozzle assembly for an aircraft propulsion system, the variable area nozzle assembly comprising:
a center plug disposed along an axis, the center plug includes a plug body and a seal, and the seal extends circumferentially about the plug body;

an outer nozzle extending circumferentially about the axis and the center plug; and an inner nozzle extending circumferentially about the axis and the center plug, the inner nozzle is disposed radially between the center plug and the outer nozzle, the inner nozzle includes an inner nozzle body, the inner nozzle body forms a secondary duct for a secondary gas stream radially between the inner nozzle body and the center plug, the inner nozzle body includes an outer radial portion, an inner converging portion, and an inner radial portion, the outer radial portion and the inner converging portion form a primary duct for a primary gas stream radially between the inner nozzle body and the outer nozzle, the inner converging portion extends between and to the outer radial portion and the inner radial portion, the inner radial portion is radially spaced inward of the outer radial portion, the inner radial portion includes an outer radial surface and an inner radial surface, the outer radial surface faces the inner converging portion, the inner radial surface faces the center plug and contacts the seal, the inner radial surface forms a nozzle outlet for the secondary gas stream downstream of the seal between the inner radial surface and the center plug, the inner radial portion forms a plurality of apertures extending between and to the outer radial surface and the inner radial surface, and the plurality of apertures are disposed at and in fluid communication with the secondary duct.

12. The variable area nozzle assembly of claim 11, wherein the outer nozzle includes an outer nozzle body, the outer nozzle body includes an outer converging portion, and the outer converging portion is disposed axially coincident with the inner converging portion.

13. The variable area nozzle assembly of claim 11, wherein the plurality of apertures includes a first aperture and a second aperture, the first aperture is disposed at a first axial position on the inner nozzle body, the second aperture is disposed at a second axial position on the inner nozzle body, and the second axial position is axially spaced from the first axial position.

14. The variable area nozzle assembly of claim 11, wherein the plug body forms one or more passages, each passage of the one or more passages includes a passage inlet and a passage outlet, the passage inlet is disposed at and in fluid communication with the secondary duct, and the passage outlet is disposed at and in fluid communication with the nozzle outlet.

15. The variable area nozzle assembly of claim 14, wherein the passage inlet is disposed axially forward of the seal and the passage outlet is disposed axially aftward of the seal.

16. A propulsion system for an aircraft, the propulsion system comprising:
a gas turbine engine disposed along an axial centerline, and the gas turbine engine forms a core flow path;
a nacelle extending circumferentially about and housing the gas turbine engine, and the nacelle forms a bypass flow path radially between the nacelle and the gas turbine engine; and
a variable area nozzle assembly comprising:
a fixed center plug disposed along the axial centerline, the fixed center plug includes a plug body and a seal, and the seal extends circumferentially about the plug body;

a fixed outer nozzle extending circumferentially about the axial centerline and the fixed center plug, the fixed outer nozzle includes a distal end; and an inner nozzle extending circumferentially about the axial centerline and the fixed center plug, the inner nozzle is disposed radially between the fixed center plug and the fixed outer nozzle, the inner nozzle includes an inner nozzle body, the inner nozzle body forms a primary duct radially between the inner nozzle and the fixed outer nozzle, the primary duct is configured to receive a core combustion gas flow from the gas turbine engine along the core flow path, the primary duct includes an exit plane at the distal end, the inner nozzle body forms a secondary duct, the secondary duct is disposed radially between the inner nozzle body and the fixed center plug upstream of the seal, the secondary duct is configured to receive at least a portion of a bypass air flow along the bypass flow path, the inner nozzle body forms a plurality of apertures, and the inner nozzle body is axially translatable between and to a first axial position and a second axial position relative to the axial centerline,
in the first axial position, the primary duct has a first cross-sectional area at the exit plane and the plurality of apertures are isolated from a nozzle outlet of the secondary duct by the seal, and
in the second axial position, the primary duct has a second cross-sectional area at the exit plane, the second cross-sectional area is less than the first cross-sectional area, and the plurality of apertures are connected in fluid communication with the nozzle outlet to direct the bypass air flow from the secondary duct and into the nozzle outlet.

17. The propulsion system of claim 16, wherein the inner nozzle body includes an outer radial portion and an inner radial portion radially spaced from the outer radial portion, the outer radial portion forms the primary duct, and the inner radial portion forms the nozzle outlet and the plurality of apertures.

18. The propulsion system of claim 17, wherein the inner radial portion includes an inner radial surface and an outer radial surface, each aperture of the plurality of apertures extends between and to the inner radial surface and the outer radial surface, the inner radial surface forms the nozzle outlet, and the inner radial surface contacts the seal.

19. The propulsion system of claim 16, wherein the plurality of apertures includes a first aperture and a second aperture, the first aperture is disposed at a first axial position on the inner nozzle body, the second aperture is disposed at a second axial position on the inner nozzle body, and the second axial position is axially spaced from the first axial position.

20. The propulsion system of claim 16, wherein the plug body forms one or more passages, each passage of the one or more passages includes a passage inlet and a passage outlet, the passage inlet is disposed at and in fluid communication with the secondary duct, and the passage outlet is disposed at and in fluid communication with the nozzle outlet.

* * * * *